(12) United States Patent
Xie et al.

(10) Patent No.: US 12,375,618 B2
(45) Date of Patent: Jul. 29, 2025

(54) METHOD AND APPARATUS FOR SHOWING SPECIAL EFFECT, ELECTRONIC DEVICE, AND COMPUTER-READABLE MEDIUM

(71) Applicant: Beijing Bytedance Network Technology Co., Ltd., Beijing (CN)

(72) Inventors: Dongju Xie, Beijing (CN); Weiming Zheng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 30 days.

(21) Appl. No.: 18/008,637

(22) PCT Filed: May 27, 2021

(86) PCT No.: PCT/CN2021/096349
§ 371 (c)(1),
(2) Date: Dec. 6, 2022

(87) PCT Pub. No.: WO2022/012182
PCT Pub. Date: Jan. 20, 2022

(65) Prior Publication Data
US 2023/0254436 A1      Aug. 10, 2023

(30) Foreign Application Priority Data
Jul. 17, 2020   (CN) .......................... 202010699334.8

(51) Int. Cl.
*H04N 5/262*   (2006.01)
*G06T 7/20*    (2017.01)
*G10H 1/36*    (2006.01)

(52) U.S. Cl.
CPC ............. *H04N 5/2621* (2013.01); *G06T 7/20* (2013.01); *G10H 1/368* (2013.01)

(58) Field of Classification Search
CPC .... H04N 5/2621; H04N 23/60; H04N 23/611; H04N 23/62; H04N 23/631; G06T 7/20;
(Continued)

(56) References Cited

U.S. PATENT DOCUMENTS 10,319,410 B1 *   6/2019   Townsend .............. G11B 27/30
2016/0299684 A1   10/2016  Miyashita
2020/0351450 A1 * 11/2020  Kim ....................... G06V 20/41

FOREIGN PATENT DOCUMENTS

CN   103077701 A   5/2013
CN   107329980 A   11/2017
(Continued)

OTHER PUBLICATIONS

Hu Fangliang et al. "Research and implementation of 3D scene post-processing special effects based on mobile platform", China Excellent Master's Thesis Full-text Database (Information Technology Series), Mar. 15, 2016.
(Continued)

*Primary Examiner* — Yogesh K Aggarwal
(74) *Attorney, Agent, or Firm* — Astute IP Law Group

(57) ABSTRACT

The present disclosure provides an effect showing method and an apparatus thereof, an electronic device, and a computer-readable medium. The method includes: opening an effect showing interface and turning on a video capturing apparatus; obtaining a music feature of background music in the effect showing interface and second effect elements generated according to the music feature, showing the second effect elements in a preset order, and controlling the second effect elements to move in the effect showing interface according to the music feature; identifying a target object in a video captured by the video capturing apparatus and controlling a first effect element in the effect showing interface to move according to a movement of the target
(Continued)

---

Opening an effect showing interface based on a triggering operation and turning on a video capturing apparatus, where a first effect element is shown in the effect showing interface — S101

Obtaining a music feature of background music in the effect showing interface and a plurality of second effect elements generated according to the music feature, showing the second effect elements in a preset order, and controlling the second effect elements to move in the effect showing interface according to the music feature — S102

Identifying a target object in a video captured by the video capturing apparatus and controlling the first effect element to move in the effect showing interface according to a movement of the target object — S103

Triggering an effect when the first effect element and the second effect elements satisfy a preset condition — S104 object; and triggering an effect when the first effect element and the second effect elements satisfy a preset condition.

20 Claims, 12 Drawing Sheets

(58) Field of Classification Search
CPC .............. G10H 1/368; G10H 1/0091; G10H 2210/021; G10H 2210/066; G10H 2220/096; G10H 1/0008; G11B 27/036; G06F 9/451; G06F 16/44
See application file for complete search history.

(56) References Cited

FOREIGN PATENT DOCUMENTS

| | | | |
|---|---|---|---|
| CN | 107770596 | A | 3/2018 |
| CN | 108111909 | A | 6/2018 |
| CN | 108322802 | A | 7/2018 |
| CN | 108810597 | A | 11/2018 |
| CN | 108833818 | A | 11/2018 |
| CN | 109040615 | A | 12/2018 |
| CN | 109120875 | A | 1/2019 |
| CN | 109615682 | A | 4/2019 |
| CN | 110769309 | A | 2/2020 |
| CN | 111077984 | A | 4/2020 |
| CN | 111177610 | A | 5/2020 |
| CN | 111240482 | A | 6/2020 |
| CN | 111857923 | A | 10/2020 |
| IN | 109462776 | A | 3/2019 |
| JP | 2015203933 | A | 11/2015 |

OTHER PUBLICATIONS

International Search Report issued in corresponding International Application No. PCT/CN2021/096349 dated Aug. 26, 2021.
Huron D., et al., "Eyebrow Movements And Vocal Pitch Height: Evidence Consistent With An Ethological Signal", The Journal of the Acoustical Society of America, Mar. 18, 2013, 6 pages.
Written Opinion for International Application No. PCT/CN2021/096349, mailed on Aug. 26, 2021, 09 Pages.

* cited by examiner

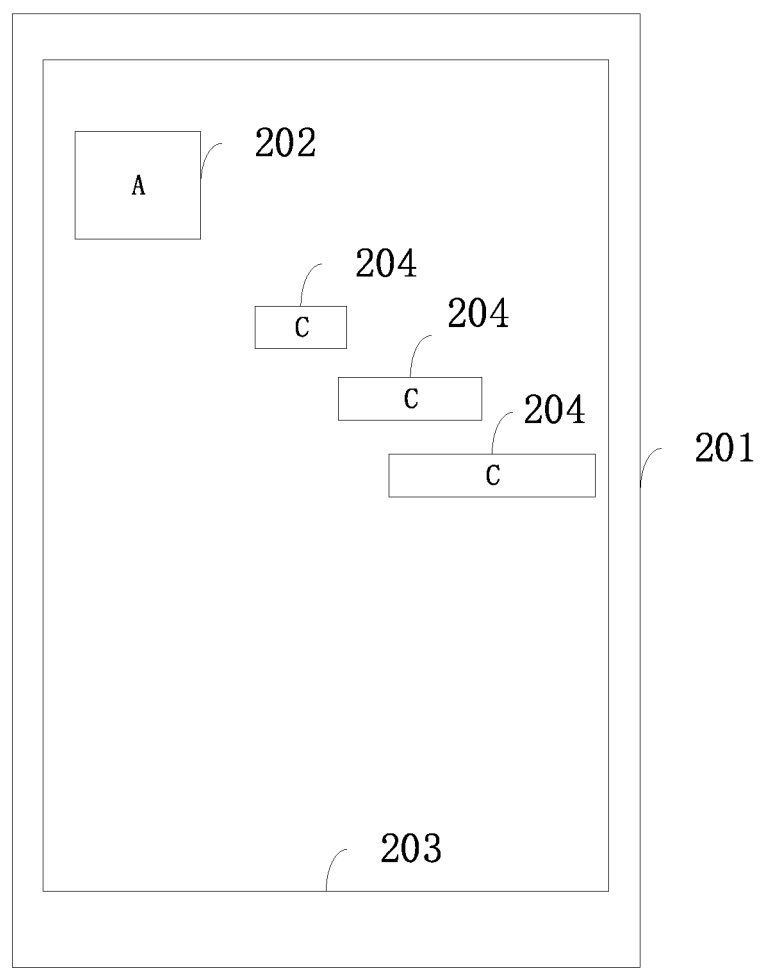
FIG. 4-a

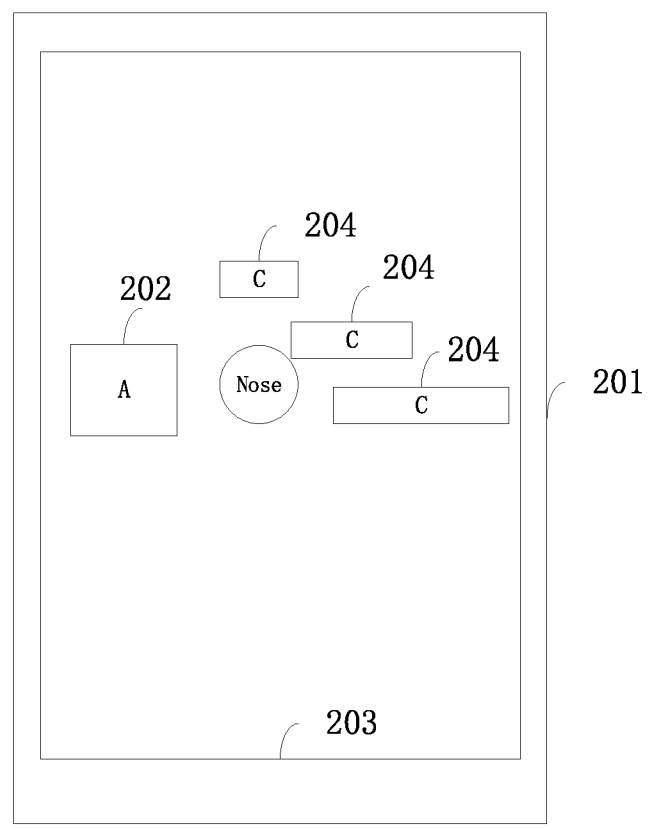
FIG. 4-b

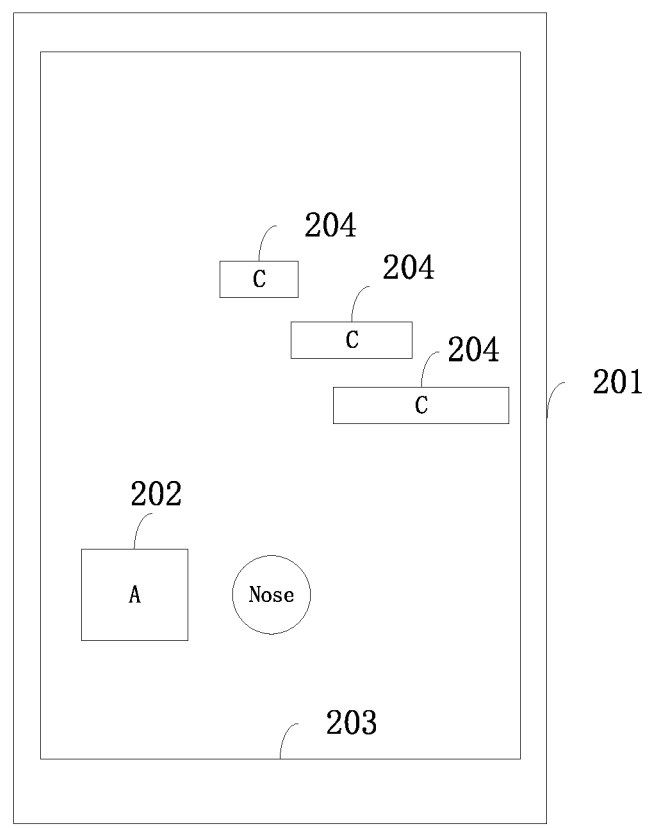
FIG. 4-c

METHOD AND APPARATUS FOR SHOWING SPECIAL EFFECT, ELECTRONIC DEVICE, AND COMPUTER-READABLE MEDIUM

The present application is a 35 U.S.C. § 371 National Phase of PCT Application No. PCT/CN2021/096349 filed May 27, 2021, which claims the priority to Chinese Patent Application No. 202010699334.8, filed on Jul. 17, 2020, the entire disclosures of which are incorporated herein by reference as part of the disclosure of this application.

TECHNICAL FIELD

The present disclosure relates to the technical field of human-computer interaction, and in particular, to a method for showing an effect and an apparatus thereof, an electronic device, and a computer-readable medium.

BACKGROUND

With the development of science and technology, the techniques of human-computer interaction have become increasingly mature. Many applications may involve human-computer interaction, and the human-computer interaction in entertainment scenarios can bring more joy for users.

SUMMARY

An embodiment of the present disclosure provides a method for showing an effect, and the method includes:
  opening an effect showing interface based on a triggering operation and turning on a video capturing apparatus, wherein a first effect element is shown in the effect showing interface;
  obtaining a music feature of background music in the effect showing interface and a plurality of second effect elements generated according to the music feature, showing the second effect elements in a preset order, and controlling the second effect elements to move in the effect showing interface according to the music feature;
  identifying a target object in a video captured by the video capturing apparatus and controlling the first effect element to move in the effect showing interface according to a movement of the target object; and
  triggering an effect when the first effect element and the second effect elements satisfy a preset condition.

Another embodiment of the present disclosure provides an apparatus for showing an effect, and the apparatus includes:
  an opening module, configured to open an effect showing interface based on a triggering operation and turn on a video capturing apparatus, wherein a first effect element is shown in the effect showing interface;
  an effect element showing module, configured to obtain a music feature of background music in the effect showing interface and a plurality of second effect elements generated according to the music feature, show the second effect elements in a preset order, and control the second effect elements to move in the effect showing interface according to the music feature;
  an effect element controlling module, configured to identify a target object in a video captured by the video capturing apparatus and control the first effect element to move in the effect showing interface according to a movement of the target object; and
  an effect showing module, configured to trigger an effect when the first effect element and the second effect elements satisfy a preset condition.

Still another embodiment of the present disclosure provides an electronic device, and the electronic device includes:
  one or more processors;
  a memory; and
  one or more applications, wherein the one or more applications are stored in the memory and configured to be executed by the one or more processors, and the one or more applications are configured to perform the above-mentioned method for showing an effect.

The fourth aspect of the present disclosure provides a computer-readable medium, the computer-readable medium is configured to store computer instructions, and the computer instructions, when executed on a computer, cause the computer to perform the above-mentioned method for showing an effect.

BRIEF DESCRIPTION OF THE DRAWINGS

In order to clearly illustrate the technical solutions of the embodiments of the present disclosure, the drawings which are needed to be used in the description of the embodiments of the present disclosure will be briefly described in the following.

FIG. 4-a is a schematic diagram of showing a first effect element and a second effect element provided by an embodiment of the present disclosure:

FIG. 4-b is a schematic diagram of showing a target object corresponding to a first effect element provided by an embodiment of the present disclosure;

FIG. 4-c is a schematic diagram of showing a first effect element corresponding to a target object provided by an embodiment of the present disclosure;

Figure 1:
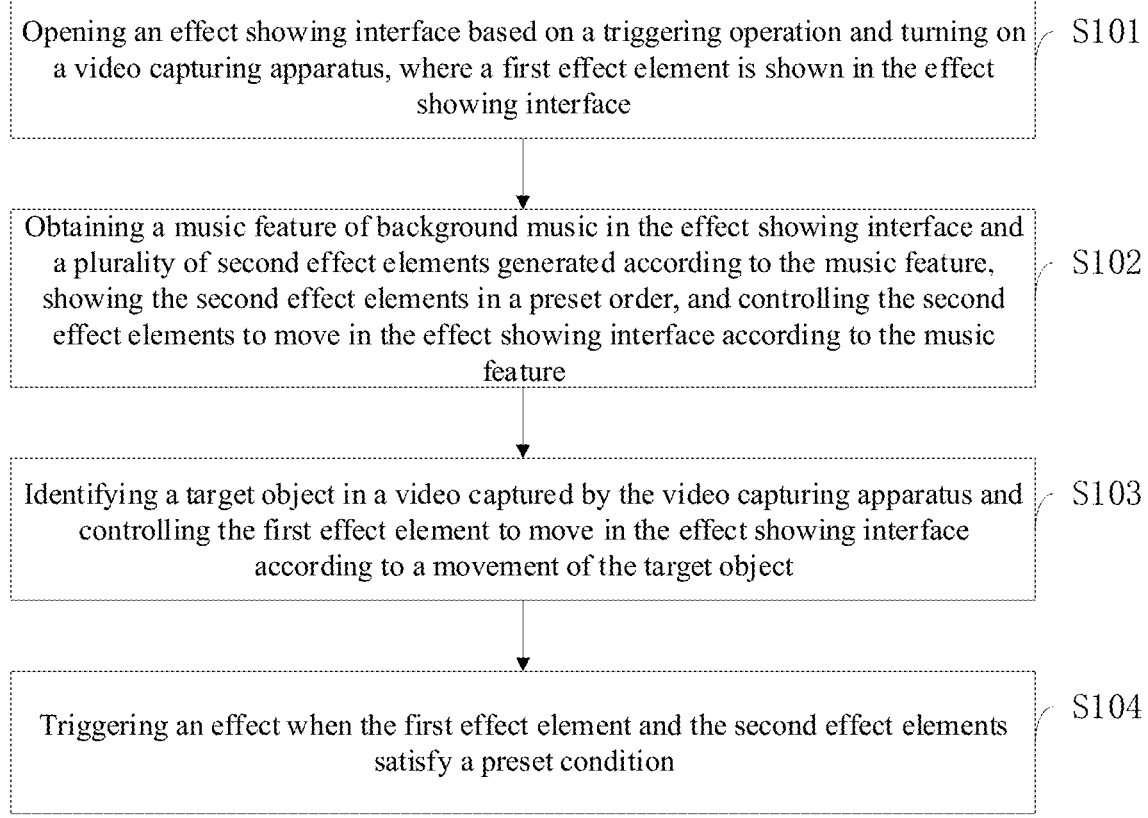
FIG. 1 is a flowchart of a method for showing an effect provided by an embodiment of the present disclosure.

The above and other features, advantages and aspects of various embodiments of the present disclosure will become more apparent when taken in conjunction with the accompanying drawings and with reference to the following detailed description. Throughout the drawings, the same or similar reference numerals refer to the same or similar elements. It should be understood that the drawings are schematic and that the components and elements are not necessarily drawn to scale.

DETAILED DESCRIPTION

The embodiments of the present disclosure will be described below in more detail with reference to the accompanying drawings. While the accompanying drawings show some embodiments of the present disclosure, it should be understood that the present disclosure may be implemented in various forms and should not be construed as being limited to the embodiments set forth herein. Rather, these embodiments are provided so that the present disclosure can be understood more thoroughly and comprehensively. It should be understood that the drawings and embodiments of the present disclosure are merely illustrative and not meant to limit the protection scope of the present disclosure.

It should be understood that steps described in the method implementations of the present disclosure may be performed in different orders and/or concurrently. In addition, the method implementations may include additional steps and/or the steps shown may be omitted. The scope of the present disclosure is not limited in this aspect.

As used herein, the term "include" and variants thereof are open words and should be construed as "including but not limited to." The term "based on" means "at least partially based on." The term "an embodiment" represents "at least one embodiment." The term "another embodiment" represents "at least one further embodiment." The term "some embodiments" represents "at least some embodiments." The relevant definitions of other terms will be given in the following descriptions.

It needs to be noted that terms such as the "first," "second," or the like mentioned in the present disclosure are only used for distinguishing between apparatuses, modules or units, and are not meant to define that these apparatuses, modules or units must be different apparatuses, modules or units and also not meant to define the order or mutual dependence relationship of functions performed by these apparatuses, modules or units.

It needs to be noted that terms such as "a/an" and "a plurality of" used herein are illustrative and non-limiting. It should be understood by a person skilled in the art that "a/an" shall be construed as "one or more" unless specified in the context otherwise.

Names of messages or information exchanged between a plurality of apparatuses in the embodiments of the present disclosure are only used for the purpose of description and not meant to limit the scope of these messages or information.

The inventors have noticed that the techniques of human-computer interaction in some entertainment scenarios simply involve obtaining a user operation and making a simple response to human-computer interaction according to the user operation. The techniques cannot provide much joy of human-computer interaction and cannot show rich effects. Moreover, there are no scenarios of human-computer interaction that incorporate musical effects, and effects cannot be shown based on musical characteristics. Therefore, the techniques are narrow in practical use range.

Thus, the techniques of human-computer interaction can only show single and uninteresting effects and need to be improved.

At least one embodiment of the present disclosure is intended to solve at least one of the technical defects described above, especially the technical problem of single and uninteresting showing of effects in the techniques of human-computer interaction.

In at least one embodiment of the present disclosure, a music feature of background music of an effect showing interface is obtained, and second effect elements are generated based on the music feature. The second effect elements are controlled to move in the effect showing interface according to the music feature. The first effect element is controlled to move in the effect showing interface by obtaining a movement of a target object in a target trail direction. An effect is triggered when the first effect element and the second effect elements satisfy a preset condition.

An embodiment of the present disclosure provides a method for showing an effect. As illustrated in FIG. 1, the method includes the following steps.

Step S101: opening an effect showing interface based on a triggering operation and turning on a video capturing apparatus, where a first effect element is shown in the effect showing interface.

Step S102: obtaining a music feature of background music in the effect showing interface and a plurality of second effect elements generated according to the music feature, showing the second effect elements in a preset order, and controlling the second effect elements to move in the effect showing interface according to the music feature.

Step S103: identifying a target object in a video captured by the video capturing apparatus and controlling the first effect element to move in the effect showing interface according to a movement of the target object.

Step S104: triggering an effect when the first effect element and the second effect elements satisfy a preset condition.

In the embodiments of the present disclosure, the provided method for showing an effect is applied to a terminal device, such as a mobile terminal, a computer device (e.g., a desktop computer, a notebook computer, an all-in-one computer, etc.), or the like. The mobile terminal may include mobile devices such as a smart phone, a palm computer, a tablet computer, a wearable device with a display screen, etc. The video capturing apparatus described above may be a video capturing apparatus that the terminal device is equipped with or an external video capturing apparatus connected to the terminal device. Alternatively, the method for showing an effect provided in the embodiments of the present disclosure may be a method for showing an effect in an application installed on the terminal device.

It needs to be noted that in the present disclosure, the "effect" refers to an effect that normally does not appear in real life and is, for example, produced by computer software. The effect includes, for example, a visual effect, an audio effect, or the like.

In the embodiments of the present disclosure, the first effect element and the second effect elements are elements for showing an effect in the embodiments of the present disclosure. The second effect elements are generated and controlled based on the music feature, and the first effect element is controlled by the movement of the target object to trigger the effect. The first effect element and the second effect elements may include but be not limited to picture elements such as an illustration, a dynamic picture, or the like. For example, the first effect element is a virtual tree hole, while the second effect elements are virtual animals. When the first effect element and the second effect elements satisfy the preset condition, e.g., the virtual animal entering the virtual tree hole, the effect is triggered.

The showing of the effect may also be related to the music, and the incorporation of music elements brings better experience for the user.

In the embodiments of the present disclosure, the target object includes a certain object in the video captured by the video capturing apparatus, which may be any object having a feature. For the embodiments of the present disclosure, to enhance the human-computer interaction experience of the user, a target object of a human body is taken as an example for description. The target object may include a face feature object, such as a nose, an eye, a mouth or the like, and may also include feature objects of other parts such as a hand or a finger.

Figure 2:
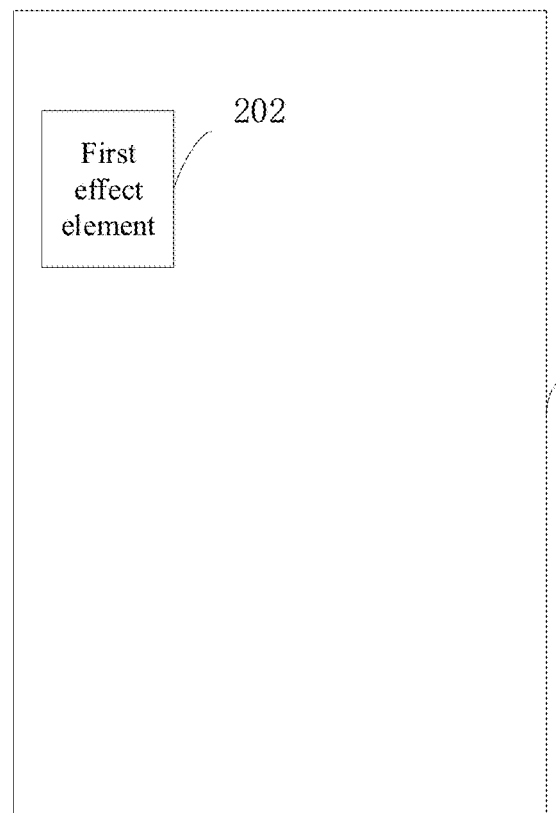
FIG. 2 is a schematic diagram of showing a first effect element provided by an embodiment of the present disclosure.
Figure 3:
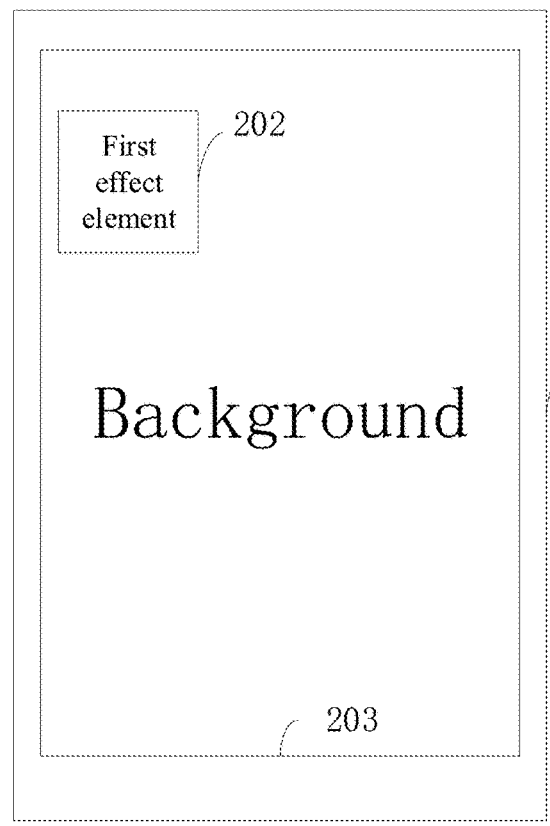
FIG. 3 is a schematic diagram of showing a background image provided by an embodiment of the present disclosure.

For the embodiments of the present disclosure, a special embodiment is taken as an example for ease of illustration. In the embodiment of the present disclosure, the method for showing an effect provided by the embodiment of the present disclosure is carried out in the terminal device. In one embodiment, the effect showing interface is opened based on the triggering operation, and the effect showing interface may be a display interface (e.g., a game interface or a shooting interface) in a certain application installed on the terminal device. The triggering operation may include a user tapping on a particular button to enter the effect showing interface, or a user using a particular speech to enter the effect showing interface, or a user using a particular expression to enter the effect showing interface, which will not be limited in the present disclosure. The effect showing interface is as illustrated in FIG. 2. In the embodiment of the present disclosure, the first effect element 202 is shown in the effect showing interface 201, where the first effect element may include various static or dynamic picture elements. Optionally, when entering the effect showing interface, a background may also be displayed in the effect showing interface. As illustrated in FIG. 3, a background image 203 is further provided in the effect showing interface 201. The background image 203 may be, for example, a background image including user interface (UI) elements such as lawns and flowers, so as to provide a better visual experience for the user, and the embodiments of the present disclosure are not limited in this aspect.

In the embodiment of the present disclosure, Step S102 includes: obtaining the music feature of the background music in the effect showing interface and the plurality of second effect elements generated according to the music feature, showing the second effect elements in the preset order, and controlling the second effect elements to move in the effect showing interface according to the music feature. In the embodiments of the present disclosure, for ease of illustration, taking the above specific embodiment as an example, the background music may be played in the effect showing interface. For each background music, a server or the terminal device may extract a music feature of the background music in advance and generate a plurality of second effect elements according to the music feature. In addition, for each background music, the terminal device may further extract the music feature of the background music in real time and generate a plurality of second effect elements according to the music feature. For ease of illustration, taking a piece of background music as an example, the number of the second effect elements corresponding to the music feature of the piece of background music, a length of each second effect element shown in the effect showing interface, a position height of each second effect element present in the effect showing interface, and a movement velocity of each second effect element in the effect showing interface are all related to the music feature of the piece of background music. The second effect elements are shown in the preset order, and the movement of each second effect element in the effect showing interface is controlled according to the music feature. As illustrated in FIG. 4-*a*, a first effect element A (i.e., the first effect element 202) and a plurality of second effect elements C (i.e., the second effect elements 204) are provided in the effect showing interface 201. Each of the second effect elements 204 enters the effect showing interface 201 in a preset order in a direction opposite to the position of the first effect element A.

Optionally, after the effect showing interface is opened, the terminal device may also play the above-mentioned background music for the user. The background music may be selected by the user or configured by default. Other function options may also be configured in the effect showing interface to better meet the demands of the user. For example, operation options such as the pause and start may be configured. The user may tap on the pause button to pause the movement of the second effect element in the current interface or may tap on the start button to allow the second effect element to move continuously in the current interface.

In the embodiment of the present disclosure, Step S103 includes: identifying the target object in the video captured by the video capturing apparatus and controlling the first effect element to move in the effect showing interface according to the movement of the target object. In the embodiment of the present disclosure, for ease of illustration, the target object is a feature object of the user's face, for example, the nose. The video capturing apparatus is a camera of the terminal device. After the camera captures an image of the user's head, the user's nose in the image of the user's head is identified, and the movement of the first effect element 202 in the effect showing interface 201 is controlled according to the movement of the user's nose. As illustrated in FIG. 4-*b*, the first effect element 202 and the plurality of second effect elements 204 are displayed in the effect showing interface 201. When the target object is identified by the terminal device, the position of the first effect element in the effect showing interface is adjusted according to the position of the target object in the effect showing interface. In one embodiment, the terminal device may adjust the position height of the first effect element in the effect showing interface according to the position height of the target object in the effect showing interface. For example, taking FIG. 4-*b* for example, when the terminal device detects that the nose is in the middle position of the effect showing interface 201, the first effect element 202 is adjusted to be displayed in the middle of the effect showing interface 201. In FIG. 4-*c*, when the terminal device detects that the nose moves to the lower portion of the effect showing interface, the first effect element 202 is adjusted to be displayed in the lower portion of the effect showing interface 201.

In the embodiment of the present disclosure, Step S104 includes triggering the effect when the first effect element and second effect elements meet the preset condition. In the embodiment of the present disclosure, for ease of illustration, taking the above specific embodiment as an example, the plurality of second effect elements are controlled to move in the effect showing interface according to the music feature, and the first effect element is controlled, by the user using the target object (e.g., the nose), to move in the effect showing interface. The effect is triggered when the first effect element and the second effect elements meet the preset condition. In one embodiment, the effect of the first effect element coming into contact with the second effect element is triggered when the first effect element is in contact with the second effect element. For example, when the first effect element is a tree hole and the second effect elements are animals, an animation effect of the animal entering the tree hole is triggered when the animal comes into contact with the tree hole, and simultaneously, effects of graphic elements such as scores, music notes and celebration graphics may be displayed, or a sound effect may be played, or the sound associated with the second effect element may be played. For example, when the second effect element is an animal element, the animal sound or the like may be played. The present disclosure has no particular limitation on this.

In the embodiment of the present disclosure, optionally, there may be a plurality of first effect elements and a plurality of target objects accordingly, where one first effect element corresponds to one target object. Different target objects control different first effect elements to move, respectively. Thus, for example, interaction among a plurality of users can be realized. For ease of illustration, taking a specific embodiment for example, when the effect showing interface is opened, a game mode may be selected, such as a two-player/multiple-player mode. In this case, two or more first effect elements may be displayed accordingly in the effect showing interface. The terminal device then turns on the video capturing apparatus to identify the target object (e.g., a nose) in the video. When the video capturing apparatus detects that a plurality of users are present in the video captured by the video capturing apparatus, the plurality of target objects (e.g., the noses) are identified, and the movement trail of each nose is identified. The corresponding first effect element is controlled to move in the effect showing interface according to the movement trail of each nose such that each first effect element comes into contact with the second effect element, and different effects are shown according to contact results. In another embodiment, in case that the terminal device turns on the video capturing apparatus to identify a plurality of target objects present in the video, the corresponding number of first effect elements may be displayed accordingly in the effect showing interface, and the movement trail of each target object is identified. The corresponding first effect element is controlled to move in the effect showing interface according to the movement trail of each target object such that each first effect element comes into contact with the second effect element, and different effects are shown according to the contact results. In the embodiment of the present disclosure, a plurality of users may control, on the same device, the first effect elements to come into contact with the second effect elements, respectively, thereby enhancing the competitive nature of the game.

According to the embodiments of the present disclosure, the music feature of the background music in the effect showing interface is obtained, and the second effect elements are generated based on the music feature. The second effect elements are controlled to move in the effect showing interface according to the music feature. The first effect element is controlled to move in the effect showing interface by obtaining the movement of the target object in the target trail direction. The effect is triggered when the first effect element and the second effect elements meet the preset condition. In addition, showing of an effect according to the embodiments of the present disclosure is related to the music, and the incorporation of music elements brings better experience for the user. Specifically, the user uses the nose to control the first effect element to move in the effect showing interface, allowing more second effect elements to come into contact with the first effect element and obtain scores. Thus, the interaction and game experience of the user can be further improved.

The embodiment of the present disclosure provides a possible implementation, and in this implementation, the music feature includes the number of feature music segments of the background music, where the number of the second effect elements corresponds to the number of the feature music segments.

In the embodiment of the present disclosure, the music feature of the background music of the effect showing interface includes the number of feature music segments, where the feature music segments may include information segments capable of characterizing the features of music elements included in the music, and the music elements may include but be not limited to the duration of the music, characters and notes included in the music, or the like. In an embodiment, the feature music segments may be divided according to the characters included in the music. For example, for the music of a Chinese song, a music segment corresponding to one Chinese character in the lyrics of the music may be regarded as one feature music segment. In an embodiment, the feature music segments may be divided according to the duration. For example, the music may be divided into a plurality of music segments according to a certain duration. In this case, one music segment may be regarded as one feature music segment. Alternatively, for different pieces of music, feature music segments may be divided in different manners according to fast and slow music rhythms. For example, for two pieces of music with the same duration, the feature music segments of the music with a fast music rhythm may be more than the feature music segments of the music with a slow music rhythm. Correspondingly, the music with the fast music rhythm may correspond to more second effect elements.

The music feature of the background music includes the number of feature music segments of the background music, and the number of the second effect elements corresponds to the number of the feature music segments. Specifically, one feature music segment may correspond to one second effect element. For example, taking the song "Two Tigers" for example, the song includes 32 Chinese characters in total, and the feature music segments may be divided according to the characters. Thus, the song may include 32 feature music segments, and 32 second effect elements may be generated correspondingly. That is, one Chinese character corresponds to one second effect element. When a plurality of second effect elements are shown in the effect showing interface, the plurality of second effect elements are shown in sequence according to the music feature of the song "Two Tigers." The user may use the target object such as the nose to control the first effect element to come into contact with the second effect element, so as to trigger the effect of contact. Further, the effects of scores, musical effects or the like may be triggered.

According to the embodiments of the present disclosure, the second effect elements are generated according to the number of the feature music segments of the music, and the effect showing process is related to the music. Thus, the user experience and interaction joy can be improved.

The embodiments of the present disclosure provide a possible implementation, and in this implementation, the music feature further includes a play duration of each feature music segment. For each second effect element, a length of the second effect element shown in the effect showing interface is positively related to the play duration of the feature music segment corresponding to the second effect element.

Figure 5:
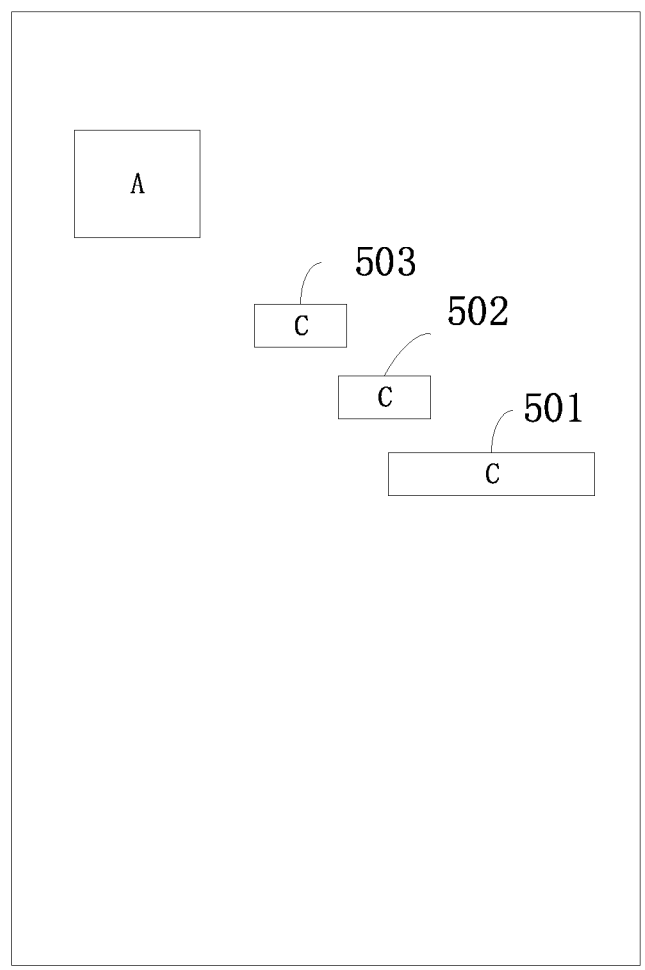
FIG. 5 is a schematic diagram of showing a plurality of second effect elements with different lengths provided by an embodiment of the present disclosure.

In the embodiments of the present disclosure, the music feature further includes the play duration of each feature music segment. For each second effect element, the length of the second effect element shown in the effect showing interface is positively related to the play duration of the feature music segment corresponding to the second effect element, and the longer the play duration of the feature music segment, the greater the length of the corresponding second effect element shown in the effect showing interface. For example, as illustrated in FIG. 5, for three second effect elements generated from "run so fast" in the song "Two Tigers," the length of the second effect element 501 corresponding to "fast" is longer than those of the second effect element 502 and the second effect element 503 corresponding to "run" and "so." The ratio of the play duration of the feature music segment to the length of the corresponding second effect element shown in the effect showing interface may be preset, which will not be limited herein. When the second effect elements are shown in the effect showing interface, the lengths of different second effect elements in the effect showing interface may differ. When the user may use the target object such as the nose to control the first effect element to come into contact with the second effect element, the contact time or duration of each second effect element with the first effect element may be different. Thus, more diverse playing methods can be provided so that the user joy can be enhanced.

In the embodiments of the present disclosure, the length of the corresponding second effect element in the effect showing interface is controlled by the play duration of the feature music segment, thereby allowing for richer visual effects on the interface, more diverse playing methods, and better user experience.

The embodiments of the present disclosure provide a possible implementation, and in this implementation, the music feature further includes a pitch of each feature music segment. For each second effect element, a position height of the second effect element shown in the effect showing interface is positively related to the pitch of the feature music segment corresponding to the second effect element.

Figure 6:
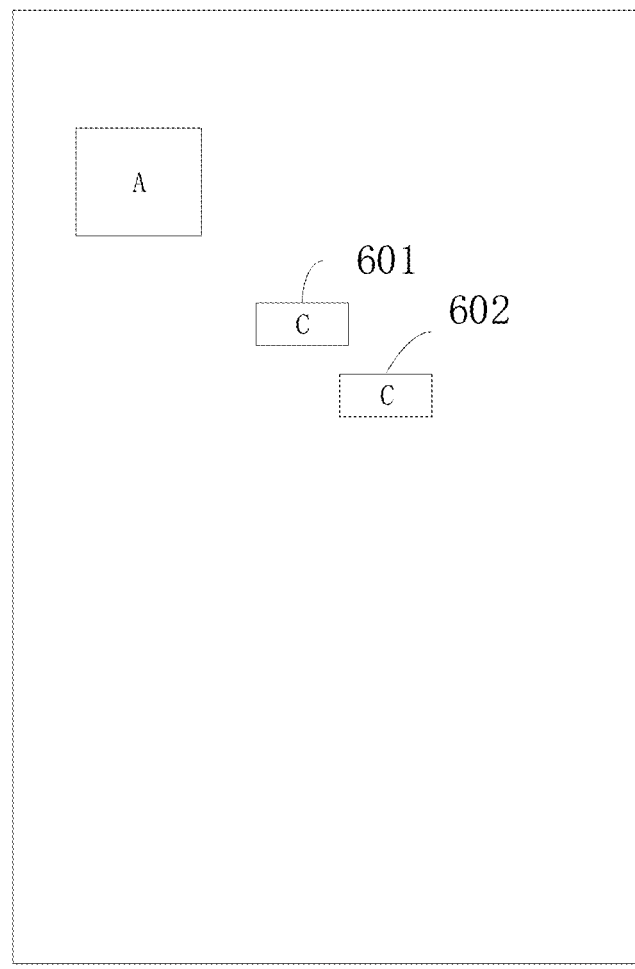
FIG. 6 is a schematic diagram of showing second effect elements at different showing position heights provided by an embodiment of the present disclosure.

In the embodiments of the present disclosure, the music feature further includes the pitch of each feature music segment. The pitch refers to the pitch of a note corresponding to the feature music segment. If the feature music segment corresponds to one note, the pitch of the feature music segment is the pitch of the note. If the feature music segment corresponds to a plurality of notes, the pitch of the feature music segment is an average value of the plurality of notes. The position height of each second effect element shown in the effect showing interface is positively related to the pitch of the feature music segment. For example, as illustrated in FIG. 6, the second effect elements corresponding to the feature music segments with different pitches are different in position height in the effect showing interface, and the pitch of the feature music segment corresponding to the second effect element 601 is higher than that of the feature music segment corresponding to the second effect element 602. Thus, as illustrated in FIG. 6, the position height of the second effect element 601 in the effect showing interface is greater than that of the second effect element 602 in the effect showing interface. When showing an effect, the second effect elements are different in position height in the effect showing interface. When the user uses the nose to control the first effect element to come into contact with the second effect element, the user may move the nose up and down, so that the interaction experience of the user can be improved.

In the embodiments of the present disclosure, the position height of the corresponding second effect element in the effect showing interface is determined according to the pitch of the feature music segment. The user may continuously control the first effect element to move up and down in the effect showing interface. Thus, the interaction experience of the user and the joy of playing the game can be improved.

The embodiments of the present disclosure provide a possible implementation, and in this implementation, the music feature further includes the number of beats of each feature music segment. For each second effect element, a movement velocity of the second effect element in the effect showing interface is positively related to the number of beats of the feature music segment corresponding to the second effect element.

In the embodiments of the present disclosure, the music feature further includes the number of beats of each feature music segment. The movement velocity of each second effect element in the effect showing interface is positively related to the number of beats of the feature music segment corresponding to the second effect element. The more the beats in a unit time period, the greater the movement velocity of the corresponding second effect element in the effect showing interface. When showing an effect, second effect elements are set to be different in movement velocity according to the rhythm of the background music. The user may use the nose to control the first effect element to come into contact with the second effect element, so that the joy of interaction in the game can be improved.

In the embodiments of the present disclosure, the movement velocity of the second effect element in the effect showing interface is controlled according to the number of beats of the feature music segment. With different pieces of music, the second effect elements are different in movement velocity with different game difficulties. Thus, the game playing methods can be increased, and the user experience can be improved.

The embodiments of the present disclosure provide a possible implementation, and in this implementation, the preset order includes a play order of the feature music segments. In the embodiments of the present disclosure, the order of the second effect elements appearing in the effect showing interface is the play order of the feature music segments corresponding to the second effect elements. For ease of illustration, taking the above specific embodiment for example, the second effect elements are controlled to appear in the effect showing interface according to the play order of the music, ensuring that the user can control the first effect element to come into contact with the second effect element and guaranteeing that the game proceeds smoothly.

Figure 7:
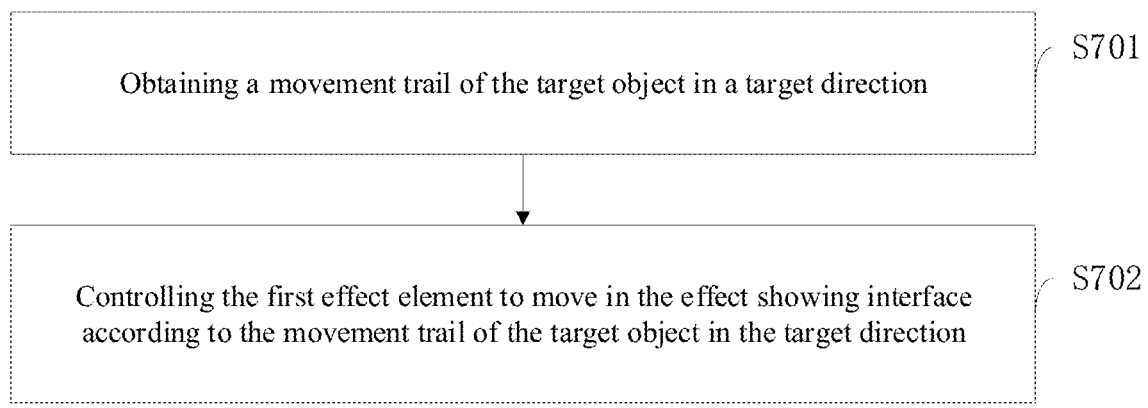
FIG. 7 is a flowchart of a method for controlling a movement of a first effect element provided by an embodiment of the present disclosure.

The embodiments of the present disclosure provide a possible implementation, and in this implementation, as illustrated in FIG. 7, controlling the first effect element to move in the effect showing interface according to the movement of the target object includes: obtaining a movement trail of the target object, and controlling the first effect element to move in the effect showing interface according to the movement trail of the target object. In one embodiment, the terminal device may obtain the movement trail of the target object and control the first effect element to move in the effect showing interface according to the movement trail of the target object, thereby controlling the first effect element to come into contact with the second effect element.

In one embodiment, controlling the first effect element to move in the effect showing interface according to the movement of the target object includes:

Step S701: obtaining a movement trail of the target object in a target direction; and Step S702: controlling the first effect element to move in the effect showing interface according to the movement trail of the target object in the target direction.

In the embodiments of the present disclosure, the target direction may include a movement direction of the first effect element, where the movement direction of the first effect element may be perpendicular to that of the second effect element. For example, when the first effect element moves in a vertical direction, the movement direction of the second effect element is a horizontal direction, and in this case, the target direction is the vertical direction. If the first effect element moves in the horizontal direction, the movement direction of the second effect element is the vertical direction, and in this case, the target direction is the horizontal direction. In addition, in an embodiment, the target direction may include a movement direction of the first effect element, where the movement direction of the first effect element may be consistent with that of the second effect element. For example, when the first effect element moves in a vertical direction, the movement direction of the second effect element may also be the vertical direction. When the first effect element moves in a horizontal direction, the movement direction of the second effect element may also be the horizontal direction. The present disclosure has no particular limitation on this.

Figure 8:
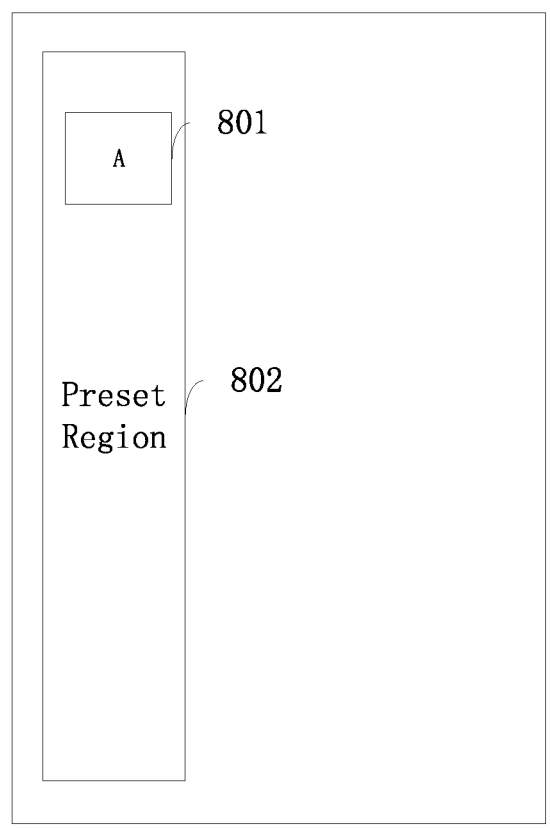
FIG. 8. is a schematic diagram of showing a preset region provided by an embodiment of the present disclosure.

As an embodiment of the present disclosure, the terminal device firstly determines the target direction, then obtains the movement trail of the target object in the target direction in the video captured by the video capturing apparatus, and controls the first effect element to move in the effect showing interface based on the movement trail. For ease of illustration, taking one of the embodiments described above as an example for description, as illustrated in FIG. 8, the first effect element 801 may move in a preset region 802. Assuming that the target direction is the vertical direction, when the user uses the target object (e.g., the nose) to control the first effect element to move in the vertical direction, the terminal device identifies the movement trail of the nose in the vertical direction and then controls the first effect element to come into contact with the second effect element according to the movement trail of the nose in the vertical direction.

A person skilled in the art should understand that the size and position of the preset region in FIG. 8 are merely illustrative, the specific size of the preset region and the position thereof in the effect showing interface may be set according to practical situations, and the present disclosure is not limited in this aspect.

In the embodiments of the present disclosure, the movement direction of the first effect element is determined as the target direction, and the movement trail of the target object in the target direction is obtained. The first effect element is controlled to move based on the movement trail, ensuring that the game proceeds normally and improving the joy and experience of user interaction.

The embodiments of the present disclosure provide a possible implementation, and in this implementation, after identifying the target object in the video captured by the video capturing apparatus, the method further includes: displaying the target object in the effect showing interface, and adjusting the position of the first effect element in the effect showing interface according to the position of the target object in the effect showing interface.

In an embodiment, the terminal device may adjust the position height of the first effect element in the effect showing interface according to the position height of the target object in the effect showing interface, so that the position of the first effect element in the effect showing interface is in the same horizontal line with the target object.

Figure 9:
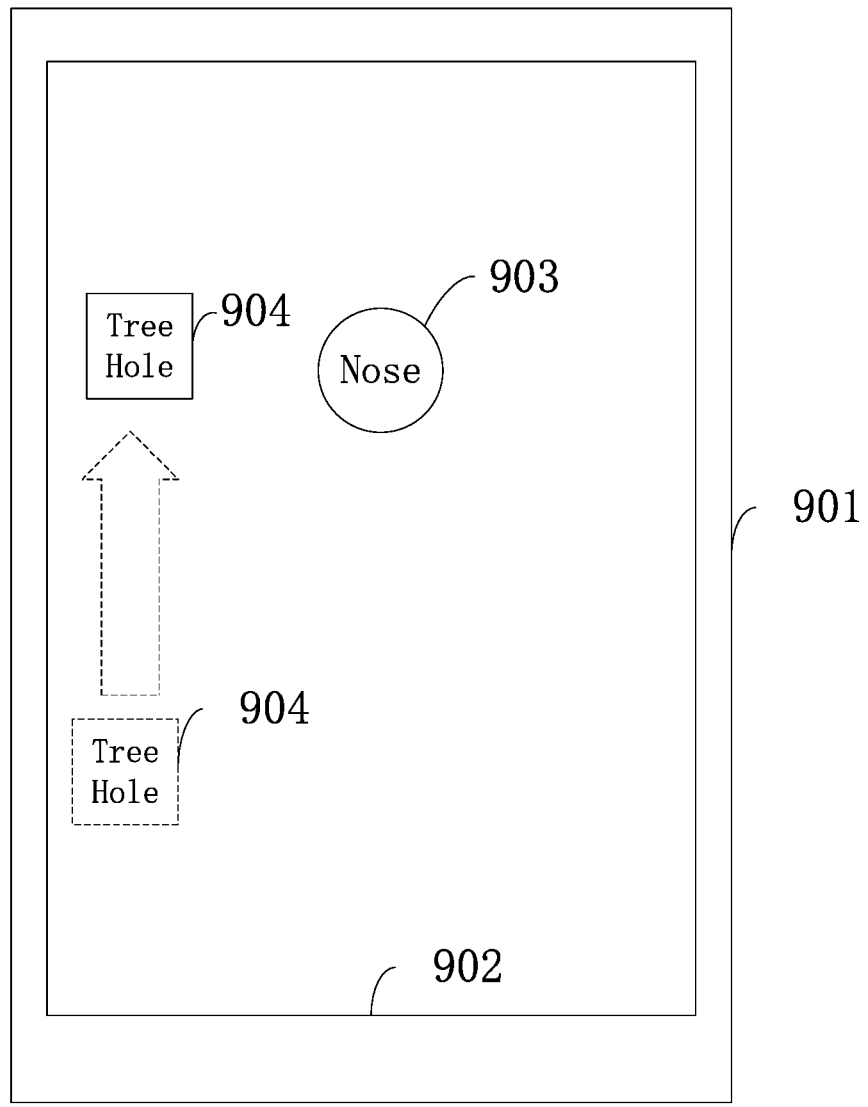
FIG. 9 is a schematic diagram of displaying a target object provided by an embodiment of the present disclosure.

In an embodiment of the present disclosure, as illustrated in FIG. 9, when the effect showing interface is opened, the terminal device displays the video captured by the video capturing apparatus in the effect showing interface, where the video includes the target object. Moreover, the position of the first effect element in the effect showing interface is adjusted according to the position of the target object in the video. For ease of illustration, taking the above specific embodiment as an example, as illustrated in FIG. 9, the video 902 captured by the video capturing apparatus is displayed in the effect showing interface 901, where the video 902 includes the target object 903 which may be a user's nose. The position of the first effect element 904 in the effect showing interface is then adjusted to be in the same horizontal line with the target object according to the position of the target object 903 in the video. For example, the position of the first effect element 904 just appearing in the effect showing interface 901 is shown by dotted lines. Thus, part of the first effect element 904 is adjusted to a position in the same horizontal line with the target object 903, thereby allowing the user to use the target object to control the movement of the first effect element.

In the embodiments of the present disclosure, the target object is displayed in the effect showing interface so that the user can see the position of the target object conveniently, and the position of the first effect element in the effect showing interface is adjusted according to the initial position of the target object, thereby facilitating the setting of the initial interface and improving the user experience.

The embodiments of the present disclosure provide a possible implementation, and in this implementation, triggering the effect when the first effect element and the second effect elements satisfy the preset condition includes: triggering a first effect when the second effect element moves to a preset region in the effect showing interface and comes into contact with the first effect element; and triggering a second effect when the second effect element moves to the preset region in the effect showing interface and is not in contact with the first effect element, where the preset region is a region in which the first effect element is capable of moving.

Figure 10:
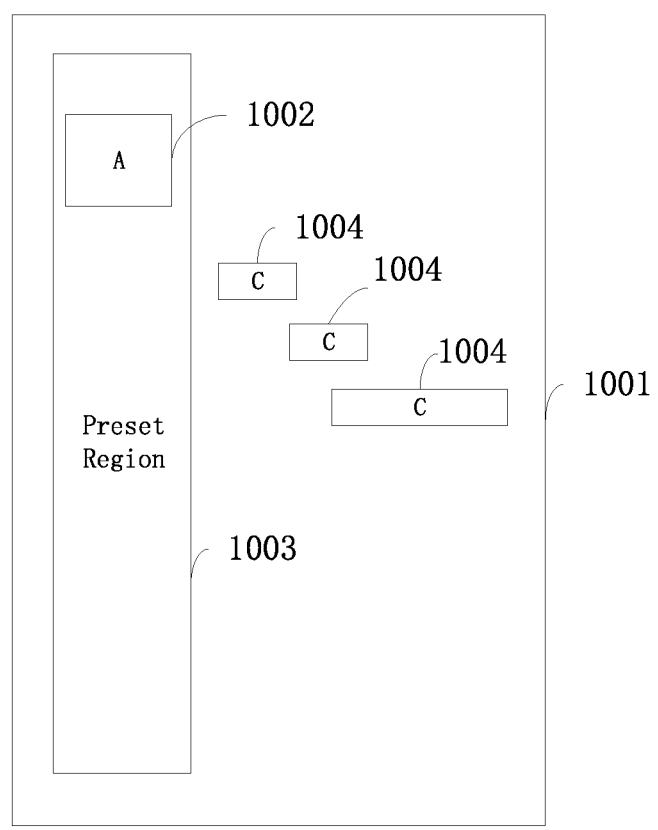
FIG. 10 is a schematic diagram of showing an effect provided by an embodiment of the present disclosure.

In the embodiments of the present disclosure, the preset region may be a region in which the first effect element is capable of moving, where the size of the preset region may be a region with a preset size on one side of the effect showing interface. As illustrated in FIG. 10, for ease of illustration, taking the above specific embodiment as an example, the first effect element 1002 (i.e., the first effect element A) is displayed in the effect showing interface 1001. The first effect element 1002 is capable of moving in the preset region 1003. In the effect showing interface 1001, a plurality of second effect elements 1004 generated according to the music feature are shown, and the second effect elements 1004 move close to the first effect element 1002 in a direction opposite to the position of the first effect element 1002. The user uses the target object such as the nose to control the first effect element 1002 to move in the preset region 1003. When the second effect element 1004 moves to the preset region 1003, if the user uses the nose to control the first effect element 1002 to come into contact with the second effect element 1004, the first effect is triggered. When the second effect element 1004 moves to the preset region 1003, if the user fails to use the nose to control the first effect element 1002 to come into contact with the second effect element 1004, the second effect is triggered.

For example, showing the first effect may include playing the first pre-configured music, such as a sound and background music associated with the second effect element, and may also include playing the first pre-configured animation. Taking for example that the first effect element is the tree hole element while the second effect elements are animal elements, the first pre-configured animation may include effects such as giving out dazzle light around the tree hole and the animals disappearing after the animal enters the tree hole. Showing the second effect may include playing the second pre-configured music or playing the second pre-configured animation. Taking for example that the first effect element is the tree hole element while the second effect elements are animal elements, the second pre-configured music may include, for example, the sound of the animal bumping into a wall or sobbing of the animal, and the second pre-configured animation may include animation effects such as the animal stopping moving, revolving stars appearing above the head of the animal, and after a period of time, the animal and the stars above the head of the animal disappearing simultaneously. Alternatively, when the user uses the nose to move the first effect element to come into contact with the second effect element within the preset region, the terminal device may set bonus points for the user and record the scores of the user in the whole song. With different pieces of background music, the second effect elements are different in movement velocity in the effect showing interface, so that different game difficulties are provided, thereby providing more choices and challenges for the user.

Figure 11:
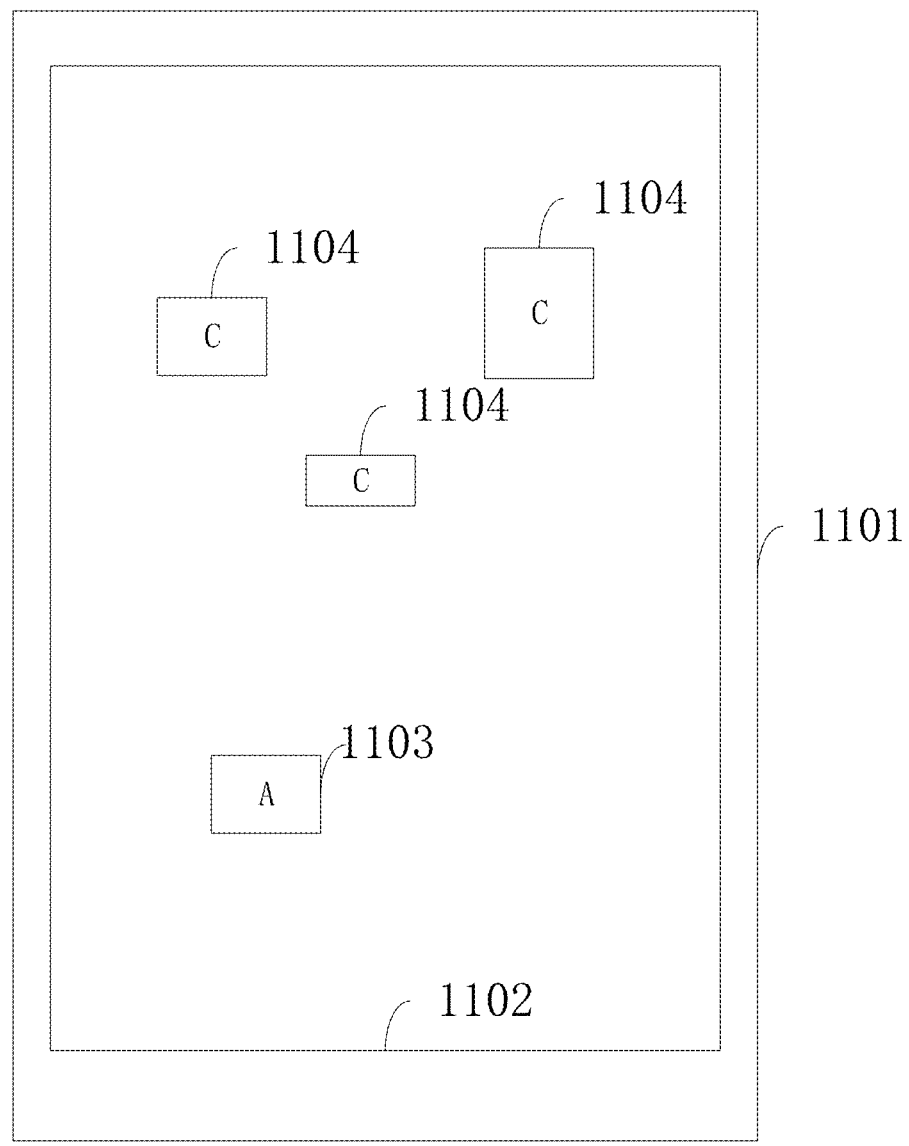
FIG. 11 is a schematic diagram of showing a preset region as an entire effect showing interface provided by an embodiment of the present disclosure.

Alternatively, in the method for showing an effect provided by the embodiments of the present disclosure, the movement range (i.e., the preset region) of the first effect element may include the entire effect showing interface or a part of the effect showing interface. As illustrated in FIG. 11, in the effect showing interface 1101, the first effect element 1102 (i.e., the first effect element A) may move arbitrarily in the preset region 1103, and the movement trail thereof is controlled by the movement trail of the target object. The second effect elements 1104 (i.e., the second effect elements C) may appear from one side of the effect showing interface. The user controls the first effect element 1102 to move in the preset region 1103 to come into contact with the second effect elements 1104. Certainly, the specific size of the preset region and the position thereof in the effect showing interface may be set according to practical situations. Regarding the preset regions different in size and setting position, the user may control the first effect element to move in different trails, thereby allowing the user to experience more game joy.

In the embodiments of the present disclosure, different effects are provided when the first effect element is or is not in contact with the second effect elements. When the user uses the target object such as the nose to control the first effect element to come into contact with the second effect elements or fails to bring the first effect element into contact with the second effect elements, different effects are triggered to be shown, thereby allowing for richer experience of the user.

Figure 12:
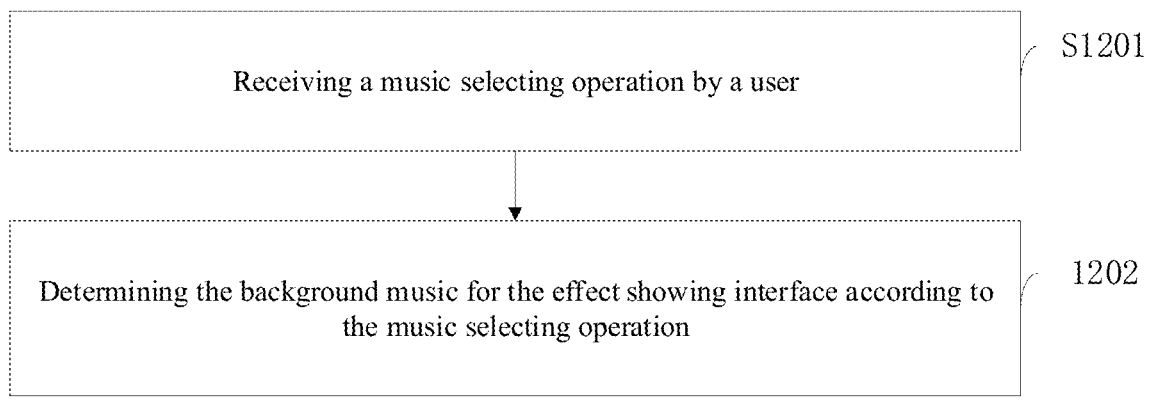
FIG. 12 is a flowchart of a method for music selecting provided by an embodiment of the present disclosure.

In a possible implementation provided in an embodiment of the present disclosure, as illustrated in FIG. 12, the method further includes:

Step S1201: receiving a music selecting operation by a user; and

Step S1202: determining the background music for the effect showing interface according to the music selecting operation.

In the embodiments of the present disclosure, the user may select different pieces of background music for the game, which correspond to different game difficulties. When the user wants to select different pieces of background music, the user can perform the music selecting operation on the effect showing interface. When receiving the music selecting operation, the terminal device determines the background music for the effect showing interface according to the music selecting operation. Moreover, for different pieces of background music, the number of the second effect elements generated by the terminal device, and the showing lengths, position heights and movement velocities thereof in the effect showing interface may also be different. For example, the user taps on a music selecting button on the effect showing interface to display a music selecting interface in the effect showing interface. There are multiple pieces of music in the music selecting interface for selection, and the user may tap on one piece of music to determine the music as the background music for the effect showing interface. In an embodiment, for each background music, the server or the terminal device may extract the music feature of the background music in advance and generate multiple second effect elements according to the music feature. In addition, for each background music, the terminal device may further extract the music feature of the background music in real time and generate multiple second effect elements according to the music feature.

In the embodiments of the present disclosure, users may select different pieces of background music according to their own preferences and thus select different game difficulties accordingly, thereby enriching the game experience.

In the embodiments of the present disclosure, the music feature of the background music of the effect showing interface is obtained, and the second effect elements are generated based on the music feature. The second effect elements are controlled to move in the effect showing interface according to the music feature. The first effect element is controlled to move in the effect showing interface by obtaining the movement of the target object in the target trail direction. The effects are triggered when the first effect element and the second effect elements meet the preset condition. The showing of the effect is related to the music, and the incorporation of music elements brings better experience for the user. Specifically, the user uses the target object to control the first effect element to move in the effect showing interface, thereby ensuring that more second effect elements come into contact with the first effect element to gain scores and further improving the game experience of the user.

Figure 13:
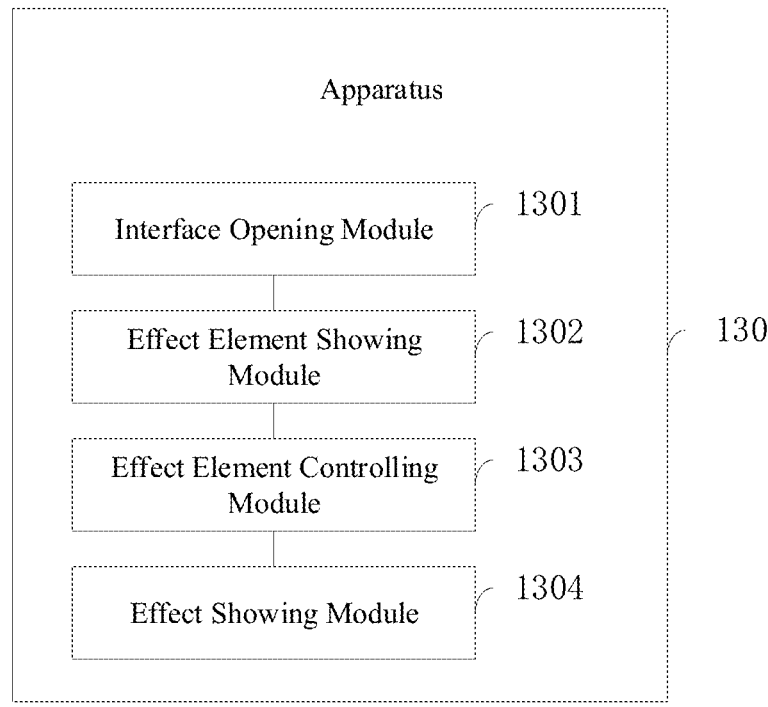
FIG. 13 is a schematic structural diagram of an apparatus for showing an effect provided by an embodiment of the present disclosure.

The embodiments of the present disclosure provide an apparatus for showing an effect. As illustrated in FIG. 13, the apparatus 130 for showing an effect may include an interface opening module 1301, an effect element showing module 1302, an effect element controlling module 1303, and an effect showing module 1304.

The interface opening module 1301 is configured to open an effect showing interface based on a triggering operation and turn on a video capturing apparatus, where a first effect element is shown in the effect showing interface.

The effect element showing module 1302 is configured to obtain a music feature of background music in the effect showing interface and a plurality of second effect elements generated according to the music feature, show the second effect elements in a preset order, and control the second effect elements to move in the effect showing interface according to the music feature.

The effect element controlling module 1303 is configured to identify a target object in a video captured by the video capturing apparatus and control the first effect element to move in the effect showing interface according to a movement of the target object.

The effect showing module 1304 is configured to trigger an effect when the first effect element and the second effect elements satisfy a preset condition.

Optionally, the music feature includes the number of feature music segments of the background music, where the number of the second effect elements corresponds to the number of the feature music segments.

Optionally, the music feature further includes a play duration of each feature music segment. For each second effect element, a length of the second effect element shown in the effect showing interface is positively related to the play duration of the feature music segment corresponding to the second effect element.

Optionally, the music feature further includes a pitch of each feature music segment. For each second effect element, a position height of the second effect element shown in the effect showing interface is positively related to the pitch of the feature music segment corresponding to the second effect element.

Optionally, the music feature further includes the number of beats of each feature music segment. For each second effect element, a movement velocity of the second effect element in the effect showing interface is positively related to the number of beats of the feature music segment corresponding to the second effect element.

Optionally, the preset order includes a play order of the feature music segments.

Optionally, when controlling the first effect element to move in the effect showing interface according to the movement of the target object, the effect element controlling module 1303 may be configured to obtain a movement trail of the target object in a target direction and control the first effect element to move in the effect showing interface according to the movement trail of the target object in the target direction.

Optionally, the apparatus for showing an effect provided by the embodiments of the present disclosure further includes a target object showing module, and the target object showing module is configured to display the target object in the effect showing interface and adjust a position of the first effect element in the effect showing interface according to a position of the target object in the effect showing interface.

Optionally, the effect showing module 1304 may be configured to trigger a first effect when the second effect element moves to a preset region in the effect showing interface and contacts with the first effect element, and trigger a second effect when the second effect element moves to the preset region in the effect showing interface and is not in contact with the first effect element, where the preset region is a region in which the first effect element is capable of moving.

Optionally, the first effect includes playing a first pre-configured sound effect, and/or playing a first pre-configured animation. The second effect includes playing a second pre-configured sound effect, and/or playing a second pre-configured animation.

Optionally, the first pre-configured sound effect includes the background music.

Optionally, the apparatus for showing an effect provided by the embodiments of the present disclosure further includes a music selecting module, and the music selecting module is configured to receive a music selecting operation by a user and determine the background music for the effect showing interface according to the music selecting operation.

The apparatus for showing an effect provided by the embodiments of the present disclosure can implement the method for showing an effect described in the above embodiments by following the same implementation principles, which will not be described herein.

In the embodiments of the present disclosure, the music feature of the background music of the effect showing interface is obtained, and the second effect elements are generated based on the music feature. The second effect elements are controlled to move in the effect showing interface according to the music feature. The first effect element is controlled to move in the effect showing interface by obtaining the movement of the target object in the target trail direction. The effects are triggered when the first effect element and the second effect elements meet the preset condition. The showing of the effect is related to the music, and the incorporation of music elements brings better experience for the user.

The user uses the target object to control the first effect element to move in the effect showing interface, thereby ensuring that more second effect elements come into contact with the first effect element to gain scores and further improving the game experience of the user.

The modules described above may be implemented as software components executed on one or more general-purpose processors or implemented as hardware, for example, for executing some functions or a combination thereof, such as a programmable logic device and/or an application-specific integrated circuit. In some embodiments, these modules may be embodied in the form of software products that may be stored on a non-transitory storage medium. The non-transitory storage medium includes instructions, and the instructions, upon execution, cause a computer device (e.g., a personal computer, a server, a network device, a mobile terminal, etc.) to carry out the method described in the embodiments of the present disclosure. In an embodiment, the modules described above may also be implemented on a single device or distributed on a plurality of devices. The functions of these modules may be combined with one another, or each module may be further divided into a plurality of submodules.

Figure 14:
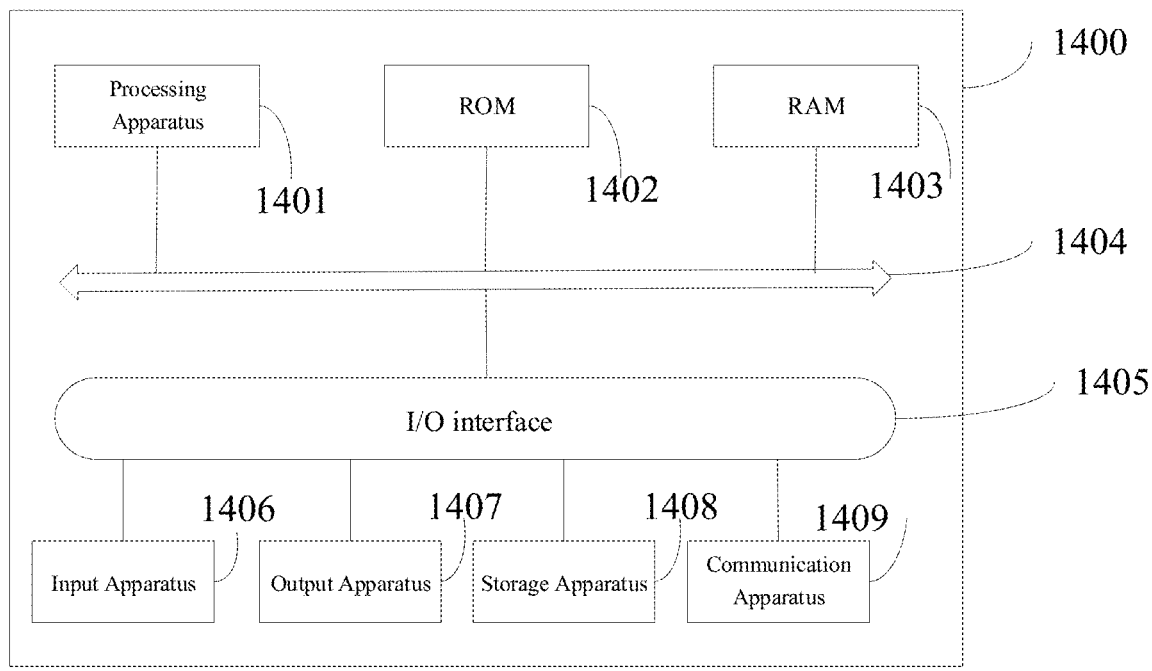
FIG. 14 is a schematic structural diagram of an electronic device provided by an embodiment of the present disclosure.

FIG. 14 is a schematic structural diagram of an electronic device 1400 adapted to implement the embodiments of the present disclosure. The electronic device in the embodiments of the present disclosure may include but be not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), and a wearable device with a display screen, and fixed terminals such as a digital TV and a desktop computer. The electronic device illustrated in FIG. 14 is merely an example, and should not pose any limitation to the functions and the range of use of the embodiments of the present disclosure.

The electronic device includes a memory and a processor. The memory is configured to store programs for performing the method according to the method embodiments described above. The processor is configured to execute the programs stored on the memory to realize the functions in the embodiments of the present disclosure described above and/or other desired functions. The processor described here may be referred to as a processing apparatus 1401 described below. The memory may include at least one of a read-only memory (ROM) 1402, a random access memory (RAM) 1403, or a storage apparatus 1408, which will be described in detail below:

As illustrated in FIG. 14, the electronic device 1400 may include a processing apparatus (e.g., a central processing unit, a graphics processing unit, etc.) 1401, which can perform various suitable actions and processing according to the program stored on the read-only memory (ROM) 1402 or the program loaded from the storage apparatus 1408 into the random access memory (RAM) 1403. The RAM 1403 further stores various programs and data required for operations of the electronic device 1400. The processing apparatus 1401, the ROM 1402, and the RAM 1403 are interconnected by means of a bus 1404. An input/output (I/O) interface 1405 is also connected to the bus 1404.

Usually, the following apparatuses may be connected to the I/O interface 1405: an input apparatus 1406 including, for example, a touch screen, a touch pad, a keyboard, a mouse, a camera, a microphone, an accelerometer, and a gyroscope: an output apparatus 1407 including, for example, a liquid crystal display (LCD), a loudspeaker, and a vibrator: a storage apparatus 1408 including, for example, a magnetic tape and a hard disk; and a communication apparatus 1409. The communication apparatus 1409 may allow the electronic device 1400 to be in wireless or wired communication with other devices to exchange data. While FIG. 14 illustrates the electronic device 1400 having various apparatuses, it should be understood that all the illustrated apparatuses are not necessarily implemented or included. More or less apparatuses may be implemented or included alternatively.

Particularly, according to the embodiments of the present disclosure, the process described above with reference to the flowchart may be implemented as a computer software program. For example, the embodiments of the present disclosure include a computer program product, which includes a computer program carried by a computer-readable medium. The computer program includes program codes for carrying out the method shown in the flowchart. In such an embodiment, the computer program may be downloaded online through the communication apparatus 1409 and installed, or installed from the storage apparatus 1408, or installed from the ROM 1402. When the computer program is executed by the processing apparatus 1401, the functions defined in the method of the embodiments of the present disclosure are executed.

It should be noted that the computer-readable medium described above in the present disclosure may be a computer-readable signal medium or a computer-readable medium or any combination thereof. For example, the computer-readable medium may be but not limited to an electric, magnetic, optical, electromagnetic, infrared, or semiconductor system, apparatus or device, or any combination thereof. More specific examples of the computer-readable medium may include but be not limited to an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination thereof. In the present disclosure, the computer-readable medium may be any tangible medium including or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium in addition to the computer-readable medium. The computer-readable signal medium may send, propagate or transmit a program used by or in combination with an instruction execution system, apparatus or device. The program codes included on the computer-readable medium may be transmitted by using any suitable medium, including but not limited to an electric wire, a fiber-optic cable, radio frequency (RF) and the like, or any appropriate combination thereof.

In some embodiments, a client and a server may communicate by means of any network protocol currently known or to be developed in future such as HyperText Transfer Protocol (HTTP), and may achieve communication and interconnection with digital data (e.g., a communication network) in any form or of any medium. Examples of the communication network include a local area network (LAN), a wide area network (WAN), an internet network (e.g., the Internet), a peer-to-peer network (e.g., ad hoc peer-to-peer network), and any network currently known or to be developed in future.

The above-mentioned computer-readable medium may be included in the electronic device described above, or may exist alone without being assembled with the electronic device.

The above-mentioned computer-readable medium may carry one or more programs which, when executed by the electronic device, cause the electronic device to perform the method described in the embodiments described above. In an embodiment, the above-mentioned one or more programs, when executed by the electronic device, cause the electronic device to perform: opening an effect showing interface based on a triggering operation and turning on a video capturing apparatus, wherein a first effect element is shown in the effect showing interface: obtaining a music feature of background music in the effect showing interface and a plurality of second effect elements generated according to the music feature, showing the second effect elements in a preset order, and controlling the second effect elements to move in the effect showing interface according to the music feature: identifying a target object in a video captured by the video capturing apparatus and controlling the first effect element to move in the effect showing interface according to a movement of the target object; and triggering an effect when the first effect element and the second effect elements satisfy a preset condition.

Computer program codes for performing the operations in the present disclosure may be written in one or more programming languages or a combination thereof. The programming languages include but are not limited to object oriented programming languages, such as Java, Smalltalk, and C++, and conventional procedural programming languages, such as C or similar programming languages. The program codes can be executed fully on a user's computer, executed partially on a user's computer, executed as an independent software package, executed partially on a user's computer and partially on a remote computer, or executed fully on a remote computer or a server. In the case that a remote computer is involved, the remote computer may be connected to a user computer via any type of network, for example, including a local area network (LAN) or a wide area network (WAN), or may be connected to an external computer (for example, connected via the Internet by using an Internet service provider).

The flowcharts and block diagrams in the accompanying drawings illustrate system architectures, functions and operations that may be implemented by the system, method and computer program product according to the embodiments of the present disclosure. In this regard, each block in the flowcharts or block diagrams may represent a module, a program segment or a part of code, and the module, the program segment or the part of code includes one or more executable instructions for implementing specified logic functions. It should also be noted that in some alternative implementations, functions marked in the blocks may also take place in an order different from the order designated in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

Related modules or units described in the embodiments of the present disclosure may be implemented by software, or may be implemented by hardware.

The functions described above herein may be performed at least partially by one or more hardware logic components. For example, exemplary types of hardware logic components that can be used without limitations include a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may include or store a program for use by or in combination with an instruction execution system, apparatus or device. The machine-readable medium may be a machine-readable signal medium or a machine-readable storage medium. The machine-readable medium may include but be not limited to an electronic, magnetic, optical, electromagnetic, infrared, or semiconductor system, apparatus or device, or any appropriate combination thereof. More specific examples of the machine-readable storage medium may include an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination thereof.

According to one or more embodiments provided by the present disclosure, a method for showing an effect is provided, and the method includes:

opening an effect showing interface based on a triggering operation and turning on a video capturing apparatus, wherein a first effect element is shown in the effect showing interface;

obtaining a music feature of background music in the effect showing interface and a plurality of second effect elements generated according to the music feature, showing the second effect elements in a preset order, and controlling the second effect elements to move in the effect showing interface according to the music feature;

identifying a target object in a video captured by the video capturing apparatus and controlling the first effect element to move in the effect showing interface according to a movement of the target object; and triggering an effect when the first effect element and the second effect elements satisfy a preset condition.

Further, the music feature comprises a total number of feature music segments of the background music, and a total number of the second effect elements corresponds to the number of the feature music segments.

Further, the music feature further comprises a play duration of each of the feature music segments; and for each second effect element, a length of the each second effect element shown in the effect showing interface is positively related to a play duration of a feature music segment corresponding to the each second effect element.

Further, the music feature further comprises a pitch of each of the feature music segments; and for each second effect element, a position height of the each second effect element shown in the effect showing interface is positively related to a pitch of a feature music segment corresponding to the each second effect element.

Further, the music feature further comprises a total number of beats of each of the feature music segments; and for each second effect element, a movement velocity of the each second effect element in the effect showing interface is positively related to the number of beats of a feature music segment corresponding to the each second effect element.

Further, the preset order comprises a play order of the feature music segments.

Further, controlling the first effect element to move in the effect showing interface according to the movement of the target object comprises: obtaining a movement trail of the target object in a target direction; and controlling the first effect element to move in the effect showing interface according to the movement trail of the target object in the target direction.

Further, after identifying the target object in the video captured by the video capturing apparatus, the method further comprises: displaying the target object in the effect showing interface, and adjusting a position of the first effect element in the effect showing interface according to an initial position of the target object in the effect showing interface.

Further, triggering the effect when the first effect element and the second effect elements satisfy the preset condition comprises: triggering a first effect when the second effect element moves to a preset region in the effect showing interface and contacts with the first effect element; and triggering a second effect when the second effect element moves to the preset region in the effect showing interface and is not in contact with the first effect element, wherein the preset region is a region in which the first effect element is capable of moving.

Further, the first effect comprises: playing a first pre-configured sound effect, and/or playing a first pre-configured animation; and the second effect comprises: playing a second pre-configured sound effect, and/or playing a second pre-configured animation.

Further, the first pre-configured sound effect is the background music.

Further, the method further includes: receiving a music selecting operation by a user; and determining the background music for the effect showing interface according to the music selecting operation.

According to one or more embodiments provided by the present disclosure, an apparatus for showing an effect is provided, and the apparatus for showing an effect includes:
  an opening module, configured to open an effect showing interface based on a triggering operation and turn on a video capturing apparatus, wherein a first effect element is shown in the effect showing interface;
  an effect element showing module, configured to obtain a music feature of background music in the effect showing interface and a plurality of second effect elements generated according to the music feature, show the second effect elements in a preset order, and control the second effect elements to move in the effect showing interface according to the music feature;
  an effect element controlling module, configured to identify a target object in a video captured by the video capturing apparatus and control the first effect element to move in the effect showing interface according to a movement of the target object; and
  an effect showing module, configured to trigger an effect when the first effect element and the second effect elements satisfy a preset condition.

Optionally, the music feature comprises a total number of feature music segments of the background music, and a total number of the second effect elements corresponds to the number of the feature music segments.

Optionally, the music feature further comprises a play duration of each of the feature music segments; and for each second effect element, a length of the each second effect element shown in the effect showing interface is positively related to a play duration of a feature music segment corresponding to the each second effect element.

Optionally, the music feature further comprises a pitch of each of the feature music segments; and for each second effect element, a position height of the each second effect element shown in the effect showing interface is positively related to a pitch of a feature music segment corresponding to the each second effect element.

Optionally, the music feature further comprises a total number of beats of each of the feature music segments; and for each second effect element, a movement velocity of the each second effect element in the effect showing interface is positively related to the number of beats of a feature music segment corresponding to the each second effect element.

Optionally, the preset order comprises a play order of the feature music segments.

Optionally, when controlling the first effect element to move in the effect showing interface according to the movement of the target object, the effect element controlling module is configured to obtain a movement trail of the target object in a target direction and control the first effect element to move in the effect showing interface according to the movement trail of the target object in the target direction.

Optionally, the apparatus for showing an effect provided by the embodiments of the present disclosure further includes a target object showing module, and the target object showing module is configured to display the target object in the effect showing interface and adjust a position of the first effect element in the effect showing interface according to an initial position of the target object in the effect showing interface.

Optionally, the effect showing module is specifically configured to trigger a first effect when the second effect element moves to a preset region in the effect showing interface and contacts with the first effect element, and trigger a second effect when the second effect element moves to the preset region in the effect showing interface and is not in contact with the first effect element, wherein the preset region is a region in which the first effect element is capable of moving.

Optionally, the first effect comprises: playing a first pre-configured sound effect, and/or playing a first pre-configured animation; and the second effect comprises: playing a second pre-configured sound effect, and/or playing a second pre-configured animation.

Optionally, the first pre-configured sound effect is the background music.

Optionally, the apparatus for showing an effect provided by the embodiments of the present disclosure further includes a music selecting module, and the music selecting module is configured to receive a music selecting operation by a user and determine the background music for the effect showing interface according to the music selecting operation.

According to one or more embodiments provided by the present disclosure, an electronic device is provided, and the electronic device includes: one or more processors; a memory; and one or more applications. The one or more applications are stored in the memory and configured to be executed by the one or more processors, and the one or more applications are configured to perform the above-mentioned method for showing an effect.

According to one or more embodiments provided by the present disclosure, a computer-readable medium is provided, and the computer-readable medium is configured to store computer instructions. The computer instructions, when executed on a computer, cause the computer to perform the above-mentioned method for showing an effect.

The foregoing are merely descriptions of the preferred embodiments of the present disclosure and the explanations of the technical principles involved. It should be understood by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the scope of the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method actions, it should be understood that the subject matter defined in the appended claims is not necessarily limited to the particular features and actions described above. Rather, the particular features and actions described above are merely exemplary forms for implementing the claims.

What is claimed is:

1. A method for showing an effect, comprising:
opening an effect showing interface based on a triggering operation and turning on a video capturing apparatus, wherein a first effect element is shown in the effect showing interface;
obtaining a music feature of background music in the effect showing interface and a plurality of second effect elements generated according to the music feature, showing the second effect elements in a preset order, and controlling the second effect elements to move in the effect showing interface according to the music feature;
identifying a target object in a video captured by the video capturing apparatus and controlling the first effect element to move in the effect showing interface according to a movement of the target object; and
triggering an effect when the first effect element and the second effect elements satisfy a preset condition.

2. The method according to claim 1, wherein the music feature comprises a total number of feature music segments of the background music, and a total number of the second effect elements corresponds to the number of the feature music segments.

3. The method according to claim 2, wherein the music feature further comprises a play duration of each of the feature music segments; and
for each second effect element, a length of the each second effect element shown in the effect showing interface is positively related to a play duration of a feature music segment corresponding to the each second effect element.

4. The method according to claim 2, wherein the music feature further comprises a pitch of each of the feature music segments; and
for each second effect element, a position height of the each second effect element shown in the effect showing interface is positively related to a pitch of a feature music segment corresponding to the each second effect element.

5. The method according to claim 2, wherein the music feature further comprises a total number of beats of each of the feature music segments; and
for each second effect element, a movement velocity of the each second effect element in the effect showing interface is positively related to the number of beats of a feature music segment corresponding to the each second effect element.

6. The method according to claim 2, wherein the preset order comprises a play order of the feature music segments.

7. The method according to claim 1, wherein controlling the first effect element to move in the effect showing interface according to the movement of the target object comprises:
obtaining a movement trail of the target object in a target direction; and
controlling the first effect element to move in the effect showing interface according to the movement trail of the target object in the target direction.

8. The method according to claim 1, wherein after identifying the target object in the video captured by the video capturing apparatus, the method further comprises:
displaying the target object in the effect showing interface, and adjusting a position of the first effect element in the effect showing interface according to an initial position of the target object in the effect showing interface.

9. The method according to claim 1, wherein triggering the effect when the first effect element and the second effect elements satisfy the preset condition comprises:
triggering a first effect when the second effect element moves to a preset region in the effect showing interface and contacts with the first effect element; and
triggering a second effect when the second effect element moves to the preset region in the effect showing interface and is not in contact with the first effect element,
wherein the preset region is a region in which the first effect element is capable of moving.

10. The method according to claim 9, wherein
the first effect comprises:
playing a first pre-configured sound effect; and/or
playing a first pre-configured animation; and
the second effect comprises:
playing a second pre-configured sound effect; and/or
playing a second pre-configured animation.

11. The method according to claim 10, wherein the first pre-configured sound effect is the background music.

12. The method according to claim 1, further comprising:
receiving a music selecting operation by a user; and
determining the background music for the effect showing interface according to the music selecting operation.

13. An apparatus for showing an effect, comprising:
an opening module, configured to open an effect showing interface based on a triggering operation and turn on a video capturing apparatus, wherein a first effect element is shown in the effect showing interface;
an effect element showing module, configured to obtain a music feature of background music in the effect showing interface and a plurality of second effect elements generated according to the music feature, show the second effect elements in a preset order, and control the second effect elements to move in the effect showing interface according to the music feature;
an effect element controlling module, configured to identify a target object in a video captured by the video capturing apparatus and control the first effect element to move in the effect showing interface according to a movement of the target object; and
an effect showing module, configured to trigger an effect when the first effect element and the second effect elements satisfy a preset condition.

14. An electronic device, comprising:
one or more processors;
a memory; and
one or more applications,
wherein the one or more applications are stored in the memory and configured to be executed by the one or more processors, and
the one or more applications are configured to perform the method for showing an effect according to claim 1.

15. A non-transitory computer-readable medium for storing computer instructions, wherein the computer instructions, when executed on a computer, cause the computer to perform the method for showing an effect according to claim 1.

16. The apparatus according to claim 13, wherein the music feature comprises a total number of feature music segments of the background music, and a total number of the second effect elements corresponds to the number of the feature music segments.

17. The apparatus according to claim 16, wherein the music feature further comprises a play duration of each of the feature music segments; and for each second effect element, a length of the each second effect element shown in the effect showing interface is positively related to a play duration of a feature music segment corresponding to the each second effect element.

18. The apparatus according to claim 16, wherein the music feature further comprises a pitch of each of the feature music segments; and for each second effect element, a position height of the each second effect element shown in the effect showing interface is positively related to a pitch of a feature music segment corresponding to the each second effect element.

19. The apparatus according to claim 16, wherein the music feature further comprises a total number of beats of each of the feature music segments; and for each second effect element, a movement velocity of the each second effect element in the effect showing interface is positively related to the number of beats of a feature music segment corresponding to the each second effect element.

20. The apparatus according to claim 16, wherein the preset order comprises a play order of the feature music segments.

\* \* \* \* \*